(12) United States Patent
Beerse et al.

(10) Patent No.: US 9,392,233 B2
(45) Date of Patent: *Jul. 12, 2016

(54) SYSTEM AND METHOD FOR COMBINED MEETING RECORDING

(75) Inventors: Chelsea Christine Beerse, Fairport, NY (US); Arno Denne, Coolock (IE); Patrick Joseph O'Sullivan, Ballsbridge (IE); Jeffrey B. Sloyer, Fisherville, VA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

This patent is subject to a terminal disclaimer.

(21) Appl. No.: 13/314,649

(22) Filed: Dec. 8, 2011

(65) Prior Publication Data

US 2013/0151601 A1 Jun. 13, 2013

(51) Int. Cl.
*G06F 15/16* (2006.01)
*H04N 7/18* (2006.01)
*H04N 19/154* (2014.01)

(52) U.S. Cl.
CPC .............. *H04N 7/183* (2013.01); *H04N 19/154* (2014.11)

(58) Field of Classification Search
CPC ......... H04N 7/183; H04N 7/155; H04N 7/15; H04N 21/44209; H04N 21/2402; H04N 19/00387; H04N 21/2343; H04N 21/64769; H04N 21/2668; H04N 21/4334; H04N 21/4135; G06F 7/76
USPC ................... 709/204, 224, 228; 370/260, 252
See application file for complete search history.

(56) References Cited

U.S. PATENT DOCUMENTS

| | | | |
|---|---|---|---|
| 7,483,618 B1* | 1/2009 | Edwards et al. | 386/278 |
| 7,653,705 B2* | 1/2010 | Gudipaty et al. | 709/218 |
| 8,228,861 B1* | 7/2012 | Nix | H04W 36/00 370/329 |
| 2002/0106190 A1* | 8/2002 | Nygren et al. | 386/68 |
| 2003/0069982 A1* | 4/2003 | Harper et al. | 709/228 |
| 2004/0156616 A1* | 8/2004 | Strub et al. | 386/46 |
| 2004/0236826 A1* | 11/2004 | Harville | H04L 29/06027 709/203 |
| 2005/0018622 A1* | 1/2005 | Halbraich et al. | 370/260 |
| 2005/0180341 A1* | 8/2005 | Nelson et al. | 370/260 |
| 2005/0277421 A1* | 12/2005 | Ng | 455/445 |
| 2006/0200519 A1* | 9/2006 | Clement | 709/204 |
| 2006/0284978 A1* | 12/2006 | Girgensohn et al. | 348/143 |
| 2007/0255579 A1* | 11/2007 | Boland et al. | 705/1 |
| 2007/0291108 A1* | 12/2007 | Huber | H04N 7/15 348/14.02 |
| 2008/0167952 A1* | 7/2008 | Blair | 705/11 |
| 2009/0034426 A1* | 2/2009 | Luft | H04L 12/2602 370/252 |
| 2009/0240818 A1* | 9/2009 | Hyndman et al. | 709/228 |
| 2009/0245143 A1* | 10/2009 | Hamachi et al. | 370/261 |
| 2010/0262690 A1 | 10/2010 | Jokinen | |
| 2010/0271498 A1* | 10/2010 | Hwang | G06T 5/50 348/222.1 |
| 2010/0325545 A1* | 12/2010 | Bennett | G06F 3/1415 715/716 |
| 2011/0038594 A1* | 2/2011 | Symons et al. | 386/224 |
| 2011/0051605 A1 | 3/2011 | Steiner | |
| 2011/0161074 A1* | 6/2011 | Pance | G10L 21/028 704/201 |

(Continued)

*Primary Examiner* — Benjamin M Thieu
(74) *Attorney, Agent, or Firm* — Brian J. Colandreo, Esq.; Jeffrey T. Placker, Esq.; Holland & Knight LLP

(57) ABSTRACT

Systems and methods for generating a recording of a meeting including receiving a respective recording of a meeting from each of a plurality of client devices. A preferred quality recording associated with each of a plurality of meeting portions is identified. The preferred quality recording associated with each of the plurality of meeting portions may be autonomically combined into a single recording representative of the meeting.

14 Claims, 4 Drawing Sheets

(56) References Cited

U.S. PATENT DOCUMENTS

| | | | |
|---|---|---|---|
| 2011/0167104 A1* | 7/2011 | Gupta | H04L 65/4061 709/203 |
| 2011/0217021 A1* | 9/2011 | Dubin | H04N 7/15 386/278 |
| 2011/0288858 A1* | 11/2011 | Gay et al. | 704/226 |
| 2012/0023107 A1* | 1/2012 | Nachnani et al. | 707/748 |
| 2012/0054276 A1* | 3/2012 | Chaturvedi et al. | 709/204 |
| 2012/0140016 A1* | 6/2012 | Shanmukhadas et al. | 348/14.1 |
| 2012/0207225 A1* | 8/2012 | Jeong | 375/240.25 |

* cited by examiner

SYSTEM AND METHOD FOR COMBINED MEETING RECORDING

BACKGROUND OF THE DISCLOSURES

The present disclosure relates to real-time collaboration, and more particularly relates to an improved technique for recording meetings.

Many technologies exist today that facilitate remote collaboration. For example, teleconferencing and video conferencing technologies may allow voice and video meetings between remote parties. Other technologies, such as web conferencing, may allow for interactive and/or multi-media collaboration between remote parties. These, as well as various other technologies have facilitated collaborative interaction between parties that are not physically proximate. The ability for remote collaboration can be of great use for organizations having physically remote facilities, and other situations that do not allow individuals to come together for in person meetings.

SUMMARY OF THE DISCLOSURE

According to a first implementation, a method may include receiving a respective recording of a meeting from each of a plurality of client devices. A preferred quality recording associated with each of a plurality of meeting portions may be identified. The preferred quality recording associated with each of the plurality of meeting portions may be autonomically combined into a single recording representative of the meeting.

One or more of the following features may be included. Each of the plurality of client devices may be associated with a participant node of the meeting. Each respective recording may include an audio recording. Each respective recording may include a multi-media recording.

Identifying the preferred quality recording may include analyzing a quality of each respective recording for each of the meeting portions. The method may further include capturing a central recording of the meeting by the computing device. Combining the preferred quality recording associated with each of the plurality of meeting portions may include modifying the central recording.

According to another implementation, a computer program product includes a computer readable medium having a plurality of instructions stored on it. When executed by a processor, the instructions may cause the processor to perform operations including receiving a respective recording of a meeting from each of a plurality of client devices. Instructions may be included for identifying a preferred quality recording associated with each of a plurality of meeting portions. The preferred quality recording associated with each of the plurality of meeting portions may be combined into a single recording representative of the meeting.

One or more of the following features may be included. Each of the plurality of client devices may be associated with a participant node of the meeting. Each respective recording may include an audio recording. Each respective recording may include a multi-media recording.

The instructions for identifying the preferred quality recording may include instructions for analyzing a quality of each respective recording for each of the meeting portions. Instructions may further be included for capturing a central recording of the meeting by the computing device. The instructions for combining the preferred quality recording associated with each of the plurality of meeting portions may include instructions for modifying the central recording.

According to yet another embodiment, a system includes a processor and a memory coupled with the processor. A first software module is executable by the processor and the memory. The first software module may be configured to receive a respective recording of a meeting from each of a plurality of client devices. A second software module is also executable by the processor and the memory. The second software module may be configured to identify a preferred quality recording associated with each of a plurality of meeting portions. A third software module may also be executable by the processor and the memory. The third software module may be configured to combine the preferred quality recording associated with each of the plurality of meeting portions into a single recording representative of the meeting.

One or more of the following features may be included. Each of the plurality of client devices may be associated with a participant node of the meeting. Each respective recording may include an audio recording. Each respective recording may include a multi-media recording.

The second software module, configured to identify the preferred quality recording, may be further configured to analyze a quality of each respective recording for each of the meeting portions. A fourth software module may be executable by the processor and the memory. The fourth software module may be configured to capture a central recording of the meeting by the computing device. The third software module, configured to combine the preferred quality recording associated with each of the plurality of meeting portions, is may be further configured to modify the central recording.

The details of one or more implementations are set forth in the accompanying drawings and the description below. Other features will become apparent from the description, the drawings, and the claims.

DETAILED DESCRIPTION OF THE INVENTION

Figure 1:
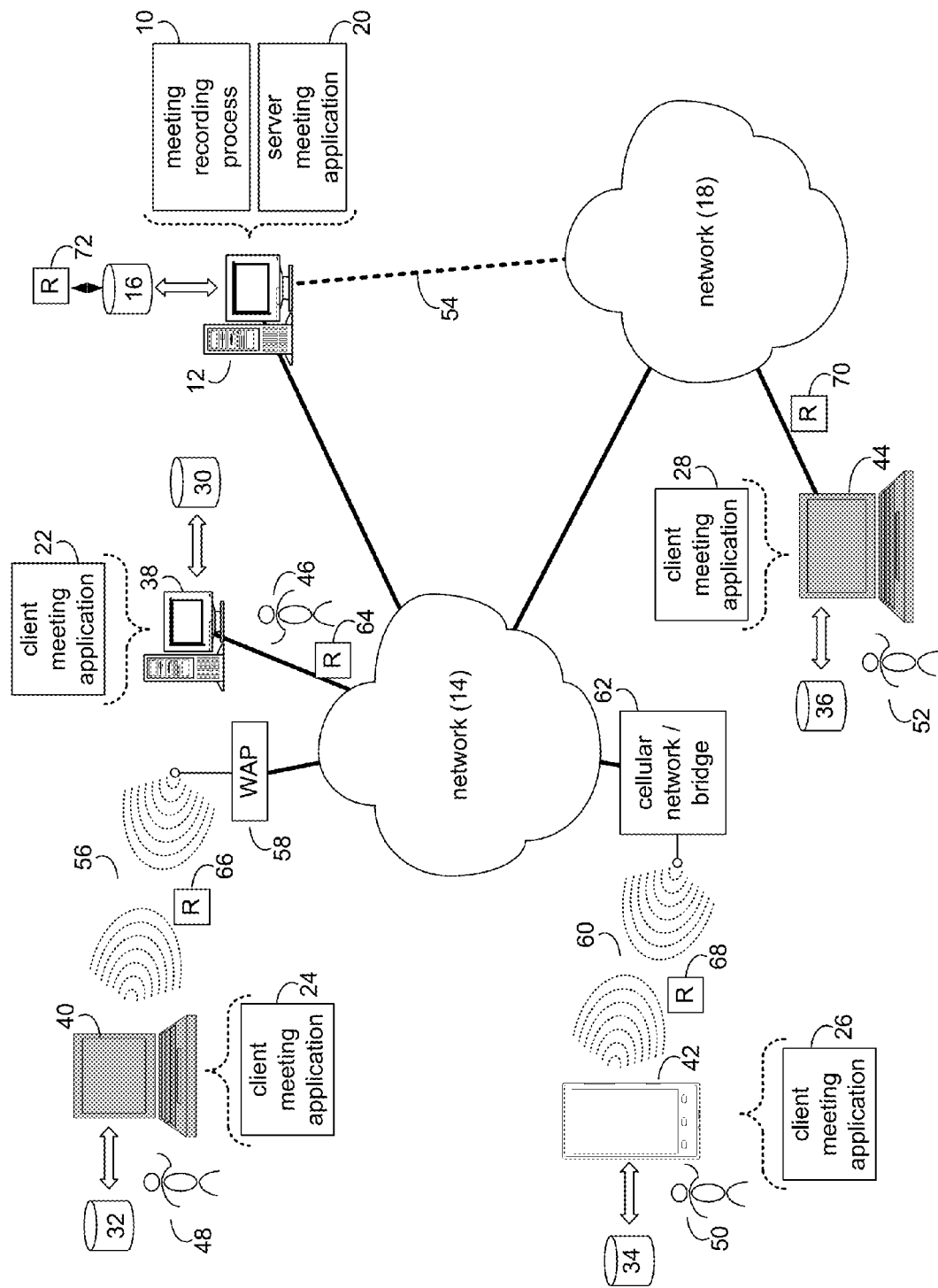
FIG. 1 diagrammatically depicts a meeting recording process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown meeting recording process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

As will be described in greater detail below, meeting recording process 10 may receive a respective recording of a meeting from each of a plurality of client devices. Meeting recording process 10 may also identify a preferred quality recording associated with each of a plurality of meeting portions. Meeting recording process 10 may combine the preferred quality recording associated with each of the plurality of meeting portions into a single recording representative of the meeting.

The instruction sets and subroutines of meeting recording process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute a server meeting application (e.g., server meeting application 20), examples of which may include, but are not limited to e.g., a web conferencing application, a video conferencing application, a voice-over-IP application, or other application that allows for virtual meeting and/or remote collaboration. The instruction sets and subroutines of server meeting application 20, which may be stored on storage device 16 coupled to server computer 12 may be executed by one or more processors (not shown) and one or more memory modules (not shown) incorporated into server computer 12. Server meeting application 20 may allow for voice, video, multi-media, or other collaborative communication between client meeting applications, e.g., client meeting applications 22, 24, 26, 28, thereby facilitating virtual meetings and/or remote collaboration. Examples of client meetings application 22, 24, 26, 28 may include, but are not limited to, web conferencing applications, video conferencing applications, voice-over-IP applications, or other application that allow for virtual meeting and/or remote collaboration.

Meeting recording process 10 may be a stand alone application, or may be an applet/application/script that may interact with and/or be executed within server meeting application 20. In addition/as an alternative to being a server-side process, the meeting recording process may be a client-side process (not shown) that may reside on a client electronic device (described below) and may interact with a client meeting application (e.g., one or more of client meeting applications 22, 24, 26, 28). Further, the meeting recording process may be a hybrid server-side/client-side process that may interact with server meeting application 20 and a client meeting application (e.g., one or more of client meeting applications 22, 24, 26, 28). As such, the meeting recording process may reside, in whole, or in part, on server computer 12 and/or one or more client electronic devices.

The instruction sets and subroutines of client meeting applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Each of client electronic devices 38, 40, 42, 44 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United Sates, other countries, or both.)

Server meeting application 20 and/or client meeting applications 22, 24, 26, 28 may enable meeting content (e.g., audio meeting content, and/or one or more of video meeting content, audio-video meeting content, displayed meeting content, and the like, herein also referred to as "multi-media" content) to be recorded by one or more of server 12 and respective client electronic devices 38, 40, 42, 44 (e.g., including storing the recorded content to respective storage devices 16, 30, 32, 34, 36 and/or one or more remote storage devices). Further, in some embodiments, one or more of server computer 12 and respective client electronic devices 38, 40, 42, 44 may include additional applications (not shown) that may record meeting content. Recording meeting content may include recording incoming meeting content (e.g., meeting content originating at a respective remote computing device and rendered on the computing device making the recording) and/or recording outgoing meeting content (e.g., meeting content originating at the respective computing device making the recording).

Using client meeting applications 22, 24, 26, 28, users 46, 48, 50, 52 may access server meeting application 20 and may allow users to e.g., participate in a virtual meeting, teleconference, video conference, or other remote collaboration. Users 46, 48, 50, 52 may access server meeting application 20 directly through the device on which the client meeting application (e.g., client meeting applications 22, 24, 26, 28) is executed, namely client electronic devices 38, 40, 42, 44, for example. Users 46, 48, 50, 52 may access server meeting application 20 directly through network 14 or through secondary network 18. Further, server computer 12 (i.e., the computer that executes server meeting application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
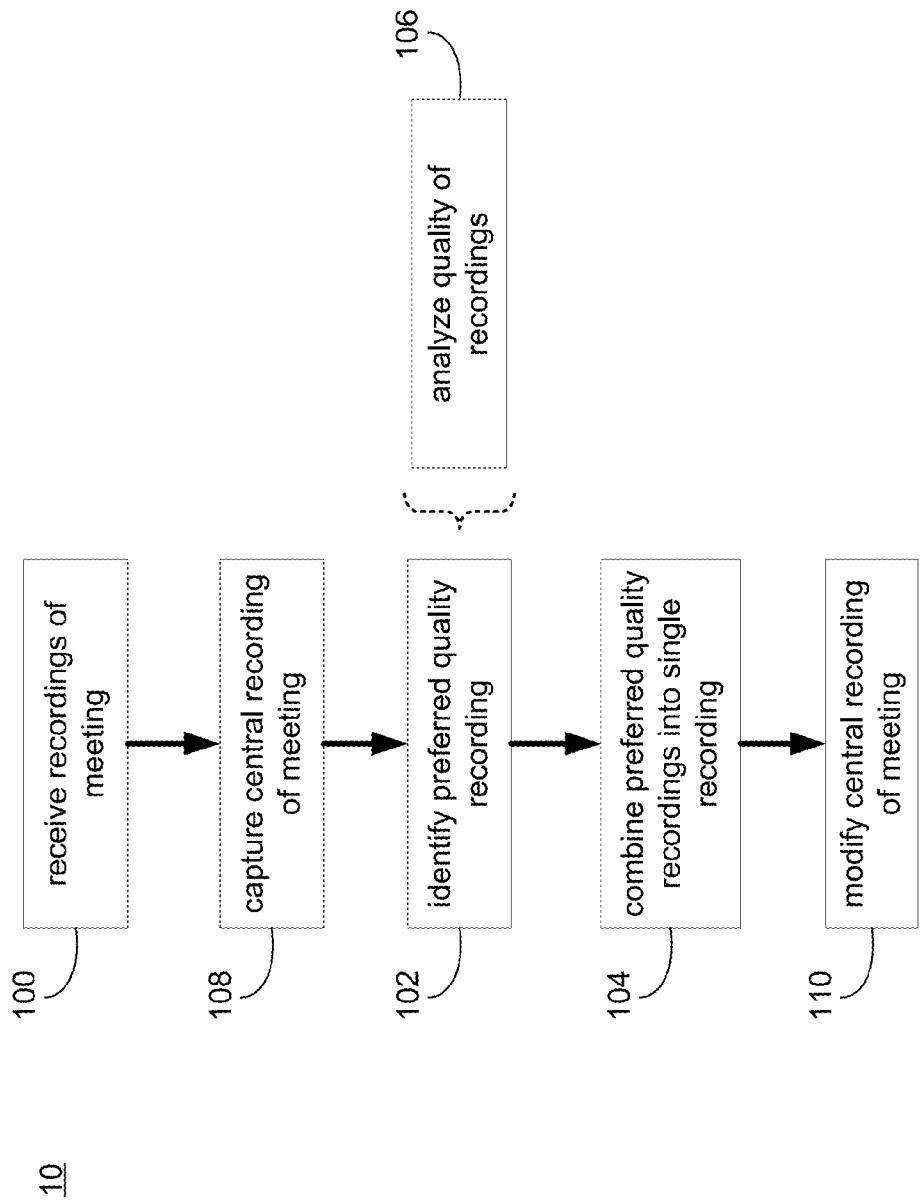
FIG. 2 is a flowchart of a process executed by the meeting recording process of FIG. 1.

Referring also to FIG. 2, meeting recording process 10 may receive 100 a respective recording of a meeting from each of a plurality of client devices. Meeting recording process 10 may further identify 102 a preferred quality recording associated with each of a plurality of meeting portions. Meeting recording process 10 may also combine 104 the preferred quality recording associated with each of the plurality of meeting portions into a single recording representative of the meeting.

For example, assume that users 46, 48, 50 and 52 engage in a meeting, such as a web conference, via respective client meeting applications 22, 24, 26, 28 executed on respective client electronic devices 38, 40, 42, 44. The web conference may include both audio and multi-media components (e.g., such as presentation slides, video conferencing features, video presentation features, or the like). For the purpose of illustration, it may be assumed that users 46, 48, and 52 may be capable of consuming both audio and multi-media components of the web conference, while user 50 (e.g., accessing the web conference via mobile computing device 42) may only access audio components of the web conference, e.g., based on network capabilities, client meeting application 26 configurations, or for various other reasons.

While the illustrative example is presented in the context of a web conference, this is intended only for the purpose of illustration and not limitation. Other meeting types are equally contemplated herein, including, but not limited to, audio only meetings (e.g., which may utilize a voice-over-IP client meeting application, a telephony system), a video conference (e.g., which may utilize one or more web cameras and associated applications), multi-media meetings, and mixed-media meetings, as well as various other meeting types.

During the course of the web conference a plurality of client devices (e.g., at least a portion of client electronic device 38, 40, 42, 44 executing respective client meeting applications 22, 24, 26, 28) may record at least a portion of the web conference. For example, client devices 38, 40, and 44, accessing both audio components of the web conference and multi-media components of the web conference, may record both audio and multi-media components of the web conference. Client device 42, accessing only audio components of the web conference, may only record audio components of the web conference. Consistent with the foregoing example, each of the client electronic devices 38, 40, 42, 44 may be associated with a participant node of the meeting. That is, each of the client electronic devices 38, 40, 42, 44 may be a client electronic device executing an application (e.g., client meeting applications 22, 24, 26, 28) that allows one or more respective users to participate and/or access the meeting. Additionally, in an embodiment, server meeting application 20 (alone and/or in conjunction with meeting recording process 10 and/or another application; not shown) may also record audio components of the web conference and/or audio and multi-media components of the web conference. Accordingly, each of the client electronic devices 38, 40, 42, 44 and server computer 12 may record the meeting to the extent possible, e.g., based upon network capability, client meeting application capability, as well as user settings (e.g., a user may elect to record only specific components of the meeting, such as an audio component).

In an illustrative example, each client electronic device 38, 40, 42, 44 (e.g., client meeting applications 22, 24, 26, 28 and/or another recording application executed by the respective client electronic devices) may record audio and/or multi-media components (collectively referred to herein as "meeting components) of the meeting. The recorded meeting components may include outgoing meeting components (e.g., meeting components that originate at the recording client electronic device and are transmitted to other client electronic devices associated with participant nodes of the meeting), the recorded meeting components may include incoming meeting components (e.g., meeting components that originate at other client electronic devices associated with participant nodes), and/or the recorded meeting components may include both outgoing and incoming meeting components. As such, meeting components that are recorded by each client device may include meeting components that originate at that respective client device and/or meeting components that originate at other respective client devices and/or at server computer 12. In some embodiments, some client devices may record both incoming and outgoing meeting components, while other client devices may record only incoming meeting components or outgoing meeting components. As generally discussed above, the various client electronic devices 38, 40, 42, 44, as well as server computer 12, may record meeting components using any suitable interfaces, including microphones and/or video cameras associated with the client electronic devices, software application or components executed by the client electronic device that may capture incoming and/or outgoing audio and/or video streams, software applications or components executed by the client electronic device that may capture images rendered on a display associated with the client electronic device, or other suitable interface.

While the foregoing description pertains to a situation in which a client electronic device associated with every participant node may record meeting components, this is intended for the purpose of illustration and not limitation. In various embodiments, less than all of the client electronic devices associated with participant nodes may record meeting components.

At least a portion of the plurality of client electronic devices may transmit the recorded meeting components (i.e., the recording of the meeting, R64, R66, R68, R70) to meeting recording process 10. In some embodiments, the plurality of client electronic devices (and/or a portion of the plurality of client electronic devices) may automatically transmit the recorded meeting components to meeting recording process 10. Further, in some embodiments the plurality of client electronic devices (and/or a portion of the plurality of client electronic devices) may transmit the recorded meeting components to meeting recording process 10 in response to a request to transmit the recorded meeting components (e.g., a request from meeting recording process 10). Additionally/alternatively, in some embodiments the plurality of client electronic devices (and/or a portion of the plurality of client electronic devices) may transmit the recorded meeting components to meeting recording process 10 in response to a user input or instruction to transmit the recorded meeting components (e.g., which user input or instruction may be in response to a request to transmit the recorded meeting components from meeting recording process 10).

In some embodiments, one or more of the various client electronic devices (e.g., via client meeting applications 22, 24, 26, 28) may transmit each respective recording of the meeting (e.g., R64, R66, R68, R70, the meeting components recorded by each respective client electronic device 38, 40, 42, 44) to meeting recording process continuously and/or intermittently during the course of the meeting. In some embodiments, one or more of the various client electronic devices 38, 40, 42, 44 may transmit a respective recording of the meeting upon completion of the meeting, e.g., immediately, or at some time after the completion of the meeting (e.g., depending upon design criteria, user and/or system settings, and/or network capabilities and/or configurations). In various embodiments, one or more of the client electronic devices 38, 40, 42, 44 may automatically transmit a respective recording of the meeting to meeting recording process 10, and/or may transmit a respective recording of the meeting to meeting recording process 10 in response to a request from meeting recording process 10.

Meeting recording process 10 may receive 100 a respective recording of the meeting (e.g., R64, R66, R68, R70) from each of the plurality of client electronic devices (e.g., client electronic devices 38, 40, 42, 44). Consistent with the foregoing discussion, each recording of the meeting from each respective client device may include an audio recording and/or may include a multi-media recording.

Meeting recording process 10 may identify 102 a preferred quality recording associated with each of a plurality of meeting portions. For example, based upon available bandwidth, noise, jitter, recording interface attributes, and the like, the plurality of recordings R64, R66, R68, R70 may vary in quality (e.g., in sound quality, in video quality, etc.), with one or more of the recordings R64, R66, R68, R70 having a higher recording quality than one or more of the other recordings. Further, the quality of one or more of the recordings R64, R66, R68, R70 may vary over the course of the meeting (e.g., as a result of changes in noise, jitter, bandwidth, or the like). The preferred quality recording may include one or more of the recordings R64, R66, R68, R70 having a recoding quality that may meet and or exceed one or more objective and/or subject (or relative) quality criteria. For example, the preferred quality recording may include one of the plurality of recordings having a quality that is better than a quality of other of the plurality of recordings (e.g., the best quality recording of the plurality of recordings R64, R66, R68, R70). In another example, the preferred quality recording may include one or more of the plurality of recording having a quality greater than a predefined threshold (e.g., in terms of noise, jitter, etc.).

The plurality of meeting portions may include discrete time-wise segments of the meeting that may together make up the entire meeting (and/or a defined portion of the meeting). For example, and referring also to FIG. 3, in an illustrative example, the meeting may include five time-wise segments, S1, S2, S3, S4, S5. Consistent with such an example, each recording R64, R66, R68, R70 may include a recording segment associated with each of the plurality of meeting portions (S1, S2, S3, S4, S5). While the illustrative example has shown the meeting including five time-wise segments, this is intended only for the purpose of illustration and explanation, as the number and time-wise length of each segment may vary depending upon design criteria and preference. For example, each time-wise segment may include a fraction of a second, and the number of segments may depend, for example, upon the length of each segment and the duration of the meeting.

Continuing with the above-stated example, meeting recording process 10 may identify 102 a preferred quality recording, including one or more of recordings R64, R66, R68, R70 associated with each of a plurality of meeting portions S1, S2, S3, S4, S5. For example, assume that (e.g., based upon design criteria) meeting recording process may identify a recording having the highest quality associated with a meeting portion as having the preferred recording quality. Further, assume that for meeting portion S1 meeting recording process 10 may identify recording R64 as including the highest quality recording. Similarly, for meeting segments S2, S3, S4, and S5 meeting recording process 10 may identify recordings R66, R68, R70, and R68 as including the highest quality recording, respectively.

Identifying 102 the preferred quality recording may include analyzing 106 a quality of each respective recording for each of the meeting portions. For example, as discussed above, the preferred quality recording may be based upon, at least in part, noise, jitter, etc., associated with each recording R64, R66, R68, R70. As will be appreciated, the quality of each recording R64, R66, R68, R70 may vary over the course of the meeting. Accordingly, meeting recording process 10 may analyze 106 the quality of each recording R64, R66, R68, R70 for each portion of the meeting S1, S2, S3, S4, S5 to determine a quality of each recording R64, R66, R68, R70 associated with each portion S1, S2, S3, S4, S5 of the meeting.

Figure 4:
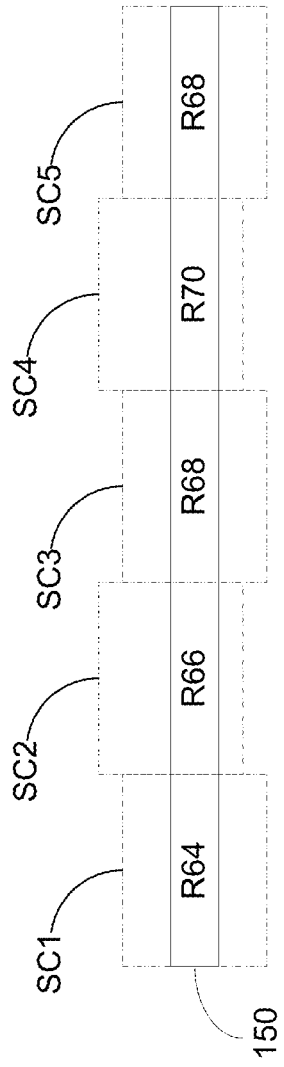
FIG. 4 graphically depicts a combined meeting recording that may be generated by the meeting recording process of FIG. 1.

Meeting recording process 10 may combine the preferred quality recording associated with each of the plurality of meeting portions into a single recording representative of the meeting. For example, and referring also to FIG. 4, meeting recording process 10 may combine each preferred quality recording associated with each portion of the meeting to generate combined recording 150. Continuing with the above-stated example, and as shown in FIG. 4, each segment SC1, SC2, SC3, SC4, SC5 of combined recording 150 may include the identified 102 preferred quality recording associated with respective segments S1, S2, S3, S4, S5 of the meeting. As such, meeting recording process 10 may provide a single recording (e.g., combined recording 150) representative of the meeting, which contains a preferred quality recording associated with each portion of the meeting. Combined recording 150 may be stored (e.g., on storage device 16) for subsequent playback. In one such embodiment, the need to playback each of the plurality of recordings R64, R66, R68, R70 to obtain a preferred recording quality may be obviated.

In the foregoing example, combined recording 150 has been described as including recording segments from each of the plurality of client electronic devices. However, this description is intended for the purpose of illustration and not of limitation. In some embodiments, one or more of the recordings may not include a preferred quality recording, and, therefore, samples or segments from such recordings may not be included in the combined recording. Further, one or more of the client electronic devices may not transmit a recording to meeting recording process 10. In such a situation, meeting recording process may generate a combined recording utilizing preferred quality recordings identified among the recordings that have been received from client electronic devices. Further, in some embodiments, meeting recording process 10 may not initially receive a recording from one or more client electronic devices. Accordingly, meeting recording process 10 may generate a combined recording based upon the recordings received. In the event that one or more client electronic devices transmits a recording to meeting recording process 10 after the combined recording has been generated, meeting recording process 10 may identify if the subsequently received recording(s) include preferred quality recording associated with one or more of the meeting portions. For example, meeting recording process 10 may identify if a portion of the subsequently received recording is of a better quality than a corresponding portion of the combined recording. If the portion of the subsequently received recoding does include a portion that is of a better quality than a corresponding portion of the combined recording, meeting recording process 10 may re-generate the combined recording, in which the better quality portion of the subsequently received recording may replace the original corresponding portion of the combined recording. A similar process may be implemented for any additional further subsequently received recordings.

Figure 3:
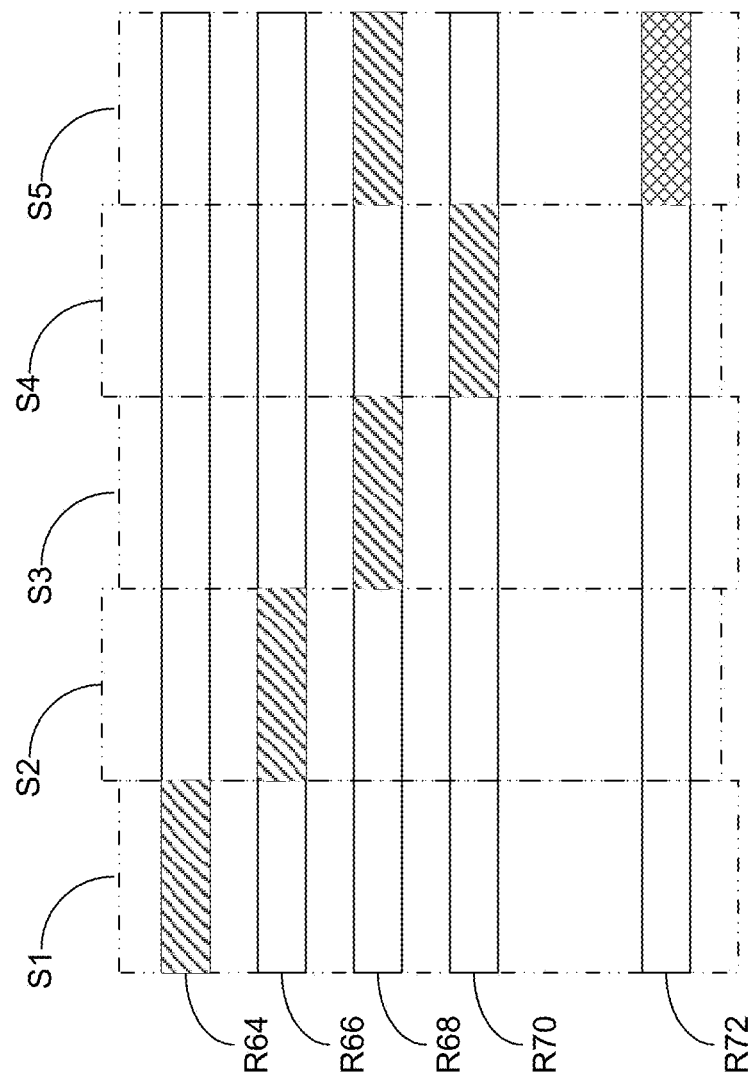
FIG. 3 graphically a plurality of recordings of a meeting that may be utilized by the meeting recording process of FIG. 1.

In some embodiments, and as discussed above, the meeting may also be recorded by server computer 12. Accordingly, in such an embodiment, meeting recording process 10 may (e.g., alone and/or in conjunction with server meeting application 20) capture 108 a central recording (e.g., central recording R72, including a recording of the meeting by server computer 12) of the meeting by the computing device. In a similar manner as discussed above, meeting recording process 10 may identify a preferred quality recording associated with each of the plurality of meeting portions, including analyzing 106 central recording R72. As shown in FIG. 3, in an illustrative example, meeting recording process 10 may identify central recording R72 as including a recording having a preferred recording quality (for example, the highest recording quality of the plurality of recordings R64, R66, R68, R70, R72) for meeting portion S5.

Continuing with the above-stated example, in which meeting recording process 10 may capture 108 central recording R72, combining 104 the preferred quality recording into a single recording may include combining the preferred quality recordings of one or more of the plurality of recordings R64, R66, R68, R70 associated with one or more portions of the meeting with a preferred quality recording R72 associated with one or more portions of the meeting, in a manner similar to that discussed above. As such, meeting recording process 10 may generate combined recording 152, shown in FIG. 5, including one or more portions of the plurality of recordings R64, R66, R68, R70, R72 associated with one or more meeting portions S1, S2, S3, S4, S5.

Figure 5:
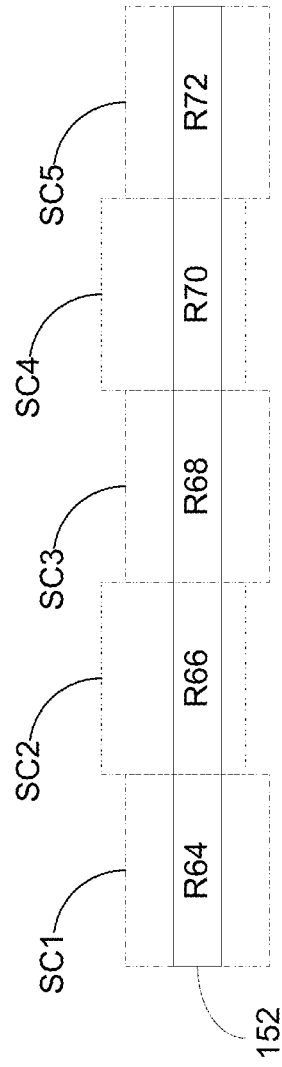
FIG. 5 graphically depicts a combined meeting recording that may be generated by the meeting recording process of FIG. 1.

In some embodiments, combining 104 the preferred quality recording into a single recording may include modifying 110 central recording R72. For example, and as shown in FIG. 5, central recording R72 may be modified 110 by replacing one or more portions of the central meeting recording R72 (e.g., segments S1, S2, S3, S4) with an identified 102 preferred quality recording (e.g., recordings R64, R66, R68, R70), e.g., which may respectively include a higher quality recording than the central meeting recording R72 associated with meeting portions segment S1, S2, S3, S4, to generate combined recording 152.

Consistent with the foregoing, in some embodiments, meeting recording process 10 may provide a complete recording of the meeting, in which the complete recording may represent the best and/or a preferred quality recording available from each of the meeting recordings received from each of the client devices. In some embodiments, the recording of the meeting provided by meeting recording process 10 may compensate for missed or bad quality recordings occurring in a central server recording or in any, or several, of the client devices associated with participant nodes. The recording provided by meeting recording process 10 may, for example, be accessible for subsequent review (e.g., by an individual seeking to review the meeting), and may, in some embodiment, be the best possible recording of the meeting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product comprising a non-transitory computer readable medium having a plurality of instructions stored thereon, which, when executed by a processor, cause the processor to perform operations including:
receiving a respective recording of a meeting from each of a plurality of client devices, wherein the meeting includes a plurality of distinct components and one or more component is associated with each recording;
identifying a preferred quality recording associated with each of a plurality of meeting portions, the plurality of meeting portions including discrete time-wise segments of the meeting, at least one of the discrete time-wise segments including meeting components from more than one recording, wherein the preferred quality recording includes a recording quality greater than a predefined threshold of one or more of noise and jitter, and includes a recording quality higher than the other respective recordings received from each of the other plurality of client devices, wherein a quality associated with each of the received respective recordings is based upon, at least in part, at least one of: available bandwidth, noise, jitter, and recording interface attributes;
combining the preferred quality recording associated with each of the plurality of meeting portions into a single recording representative of the meeting; and
modifying the combined preferred quality recording by replacing one or more portions of the combined preferred quality recording with a new identified preferred quality recording associated with the one or more portions of the combined preferred quality recording that is higher quality than the one or more portions of the combined preferred quality recording.

2. The computer program product according to claim 1, wherein each of the plurality of client devices are associated with a participant node of the meeting.

3. The computer program product according to claim 1, wherein each respective recording includes an audio recording.

4. The computer program product according to claim 1, wherein each respective recording includes a multi-media recording.

5. The computer program product according to claim 1, wherein the instructions for identifying the preferred quality recording include instructions for analyzing a quality of each respective recording for each of the meeting portions.

6. The computer program product according to claim 1, further comprising instructions for capturing a central recording of the meeting by the computing device.

7. The computer program product according to claim 6, wherein the instructions for combining the preferred quality recording associated with each of the plurality of meeting portions include instructions for modifying the central recording.

8. A system comprising:

a processor and a memory coupled with the processor;

a first software module executable by the processor and the memory, the first software module configured to receive a respective recording of a meeting from each of a plurality of client devices, wherein the meeting includes a plurality of distinct components and one or more component is associated with each recording;

a second software module executable by the processor and the memory, the second software module configured to identify a preferred quality recording associated with each of a plurality of meeting portions, the plurality of meeting portions including discrete time-wise segments of the meeting, at least one of the discrete time-wise segments including meeting components from more than one recording, wherein the preferred quality recording includes a recording quality greater than a predefined threshold of one or more of noise and jitter, and includes a recording quality higher than the other respective recordings received from each of the other plurality of client devices, wherein a quality associated with each of the received respective recordings is based upon, at least in part, at least one of: available bandwidth, noise, jitter, and recording interface attributes;

a third software module executable by the processor and the memory, the third software module configured to combine the preferred quality recording associated with each of the plurality of meeting portions into a single recording representative of the meeting; and a fourth software module executable by the processor and the memory, the fourth software module configured to modify the combined preferred quality recording by replacing one or more portions of the combined preferred quality recording with a new identified preferred quality recording associated with the one or more portions of the combined preferred quality recording that is higher quality than the one or more portions of the combined preferred quality recording.

9. The system according to claim 8, wherein each of the plurality of client devices are associated with a participant node of the meeting.

10. The system according to claim 8, wherein each respective recording includes an audio recording.

11. The system according to claim 8, wherein each respective recording includes a multi-media recording.

12. The system according to claim 8, wherein the second software module, configured to identify the preferred quality recording, is further configured to analyze a quality of each respective recording for each of the meeting portions.

13. The system according to claim 8, further comprising a fifth software module executable by the processor and the memory, the fifth software module configured to capture a central recording of the meeting by the computing device.

14. The system according to claim 13, wherein the third software module, configured to combine the preferred quality recording associated with each of the plurality of meeting portions, is further configured to modify the central recording.

* * * * *